Patented July 25, 1939

2,167,142

UNITED STATES PATENT OFFICE 2,167,142

AZO DYES

Frithjof Zwilgmeyer, Arden, Del., assignor to E. I. du Pont de Nemours & Company, Wilmington, Del., a corporation of Delaware No Drawing. Application July 3, 1937, Serial No. 151,966

5 Claims. (Cl. 260—204)

This invention relates to new azo dyestuffs, especially to ice colors which are obtained by coupling diazotized cresidines with azo dye coupling components which are free from solubilizing groups, to fibres dyed with the dyes and to compositions and processes for dyeing.

Heretofore, ice colors have been produced by coupling on the fibre various stabilized diazotized aryl amines with azo dye coupling components. The coupling component most commonly used was 2:3-hydroxy-naphthoic acid. Although the cresidines are readily available aryl amines, these compounds have not been used for the described purposes insofar as we are aware. It has now been discovered that diazotized cresidines can be stabilized and used to make colored compounds and dyeings by the ice color processes, particularly for the dyeing of cellulosic fibres, such as cotton and regenerated cellulose.

It is an object of this invention to provide azo compounds which are obtained by coupling azo dye coupling components which are free from solubilizing groups to diazotized cresidine. Another object of the invention is to provide compositions for dyeing which contain an azo dye coupling component and diazotized cresidine which is stabilized against coupling until developing agents are applied. Another object of the invention is to provide fabrics dyed with the composition. Another object of the invention is to provide processes for making said compounds and dyeings. Still other objects of the invention will be apparent from the following more detailed description.

The objects of the invention may be attained in general by diazotizing cresidine and combining the diazotized cresidine with a stabilizing compound which will stabilize the diazo compound against coupling in alkaline medium but will permit the coupling reaction in acidic media, such as water soluble diazoimino compounds or antidiazotates which can be prepared by methods well known in the art. The material to be dyed is impregnated with these alkaline compositions and the dye is developed by hydrolysis of the stabilized diazo as by treatment with acid whereupon the color is developed.

In the following more detailed description reference will be made to the examples which illustrate the invention but the invention is not limited thereto. In the examples the quantities are given in parts by weight unless otherwise specified.

Example 1

A printing paste was prepared by mixing 2 parts of the diazo imino compound represented by the formula

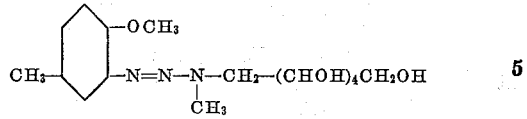

which was obtained by the action of diazotized cresidine on methyl glucamine, 2 parts of the 2:5 dimethyl-4 chlor anilide of 2:3-hydroxy-naphthoic acid, 4 parts of the mono ethyl ether of ethylene glycol, 24 parts of water, 3 parts of sodium hydroxide solution (30%) and 65 parts of a thickener.

The thickener was made by mixing 60 parts of wheat starch, 580 parts of water and 360 parts of tragacanth 6% solution.

Cotton and rayon piece goods were printed on an engraved roller with the above printing paste. The printed fabric was dried in the air and then subjected to the action of live steam containing the vapors of acetic acid. A color development took place. The printed goods were rinsed with water, boiled for 5 min. in a 0.5% soap solution, again rinsed and dried. A deep bordeaux dyeing of good fastness properties was obtained. The new color is represented by the formula

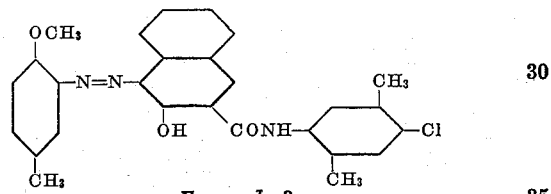

Example 2

A printing paste was prepared by mixing 2.3 parts of the diazo imino compound mentioned in Example 1, 1.7 parts of the aceto acet-3 chlor-4 ethoxy-aniline, 4 parts of the mono ethyl ether of ethylene glycol, 24 parts of sodium hydroxide solution (30%) and 65 parts of the thickener mentioned in Example 1.

Cotton or rayon piece goods were printed with the above composition and developed as described in Example 1. A bright yellow dyeing was obtained of good general fastness properties. The new color had the following probable formula:

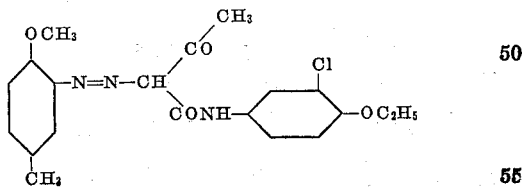

Example 3

A printing paste was prepared by mixing 1.9 parts of the diazo imino compound mentioned in Example 1, 2.1 parts of the 2-4 dimethyl-5 nitro anilide of 2:3-hydroxy naphthoic acid, 4 parts of the mono ethyl ether of ethylene glycol, 24 parts of water, 3 parts sodium hydroxide solution (30%) and 65 parts of the thickener mentioned in Example 1.

Cotton and rayon piece goods were printed with the above composition and developed as described in Example 1. A bordeaux dyeing was obtained of good general fastness properties. The new color had the following probable formula:

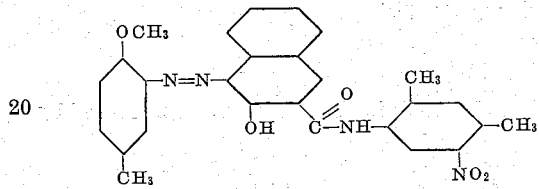

Example 4

A printing paste was prepared by mixing 2.2 parts of the diazo imino compound mentioned in Example 1, 1.8 parts of the anilide of 2-3-hydroxy-naphthoic acid, 4 parts of the mono ethyl ether of ethylene glycol, 24 parts water, 3 parts sodium hydroxide solution (30%) and 65 parts of thickener as mentioned in Example 1.

Cotton and rayon piece goods were printed with the above composition and developed as described in Example 1. A bluish red dyeing was obtained of good general fastness properties. The new color had the following probable formula:

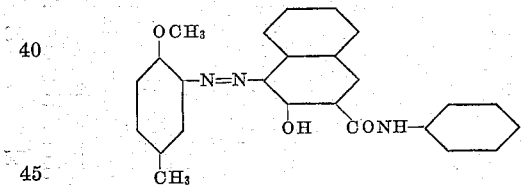

Example 5

A printing paste was prepared by mixing 2.2 parts of the diazo imino compound mentioned in Example 1, 1.8 parts of the 2-methyl anilide of 2-3-hydroxy-naphthoic acid, 4 parts of the mono ethyl ether of ethylene glycol, 24 parts of water, 3 parts of sodium hydroxide solution (30%) and 65 parts of thickener mentioned in Example 1.

Cotton and rayon piece goods were printed with the above composition and developed as described in Example 1. A bluish red dyeing was obtained of good general fastness properties. The new color had the following probable formula:

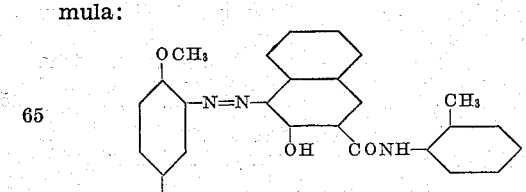

Example 6

A printing paste was prepared by mixing 2.1 parts of the diazo imino compound mentioned in Example 1, 1.9 parts of 2-ethoxy-anilide of 2-3-hydroxy-naphthoic acid, 4 parts of the mono ethyl ether of ethylene glycol, 24 parts of water, 3 parts of sodium hydroxide solution (30%) and 65 parts of thickener as mentioned in Example 1.

Cotton and rayon piece goods were printed with the above composition and developed as described in Example 1. A bluish red dyeing was obtained of good general fastness properties. The new color had the following probable formula:

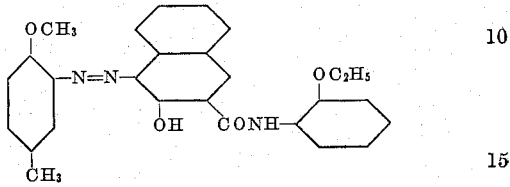

Example 7

A printing paste was prepared by mixing 2.1 parts of the diazo imino compound mentioned in Example 1, 1.9 parts of the 4-chlor-anilide of 2-3-hydroxy-naphthoic acid, 4 parts of the mono ethyl ether of ethylene glycol, 24 parts of water, 3 parts of sodium hydroxide solution (30%) and 65 parts of thickener as mentioned in Example 1.

Cotton and rayon piece goods were printed with the above composition and developed as described in Example 1. A bluish red dyeing was obtained of good general fastness properties. The new color had the following probable formula:

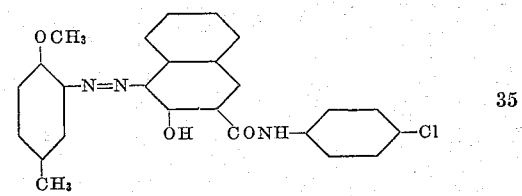

Example 8

A printing paste was prepared by mixing 2.1 parts of the diazo imino compound mentioned in Example 1, 1.9 parts of the 2-4-dimethyl anilide of 2:3-hydroxy naphthoic acid, 4 parts of the mono ethyl ether of ethylene glycol, 24 parts of water, 3 parts of sodium hydroxide solution (30%) and 65 parts of thickener as mentioned in Example 1.

Cotton and rayon piece goods were printed with the above composition and developed as described in Example 1. A bluish red dyeing was obtained of good general fastness properties. The new color had the following probable formula:

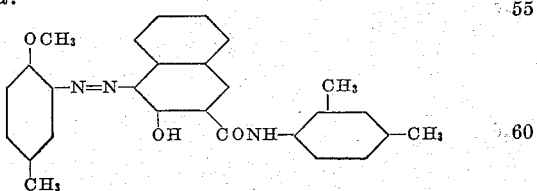

Example 9

A printing paste was prepared by mixing 2 parts of the diazo imino compound mentioned in Example 1, 2 parts of the 2-4 dimethyl-5 chlor-anilide of 2:3-hydroxy naphthoic acid, 4 parts of the mono ethyl ether of ethylene glycol, 24 parts of water, 3 parts of sodium hydroxide solution (30%) and 65 parts of thickener as mentioned in Example 1.

Cotton and rayon piece goods were printed with the above composition and developed as described in Example 1. A bordeaux dyeing was obtained of good general fastness properties. The new color had the following probable formula:

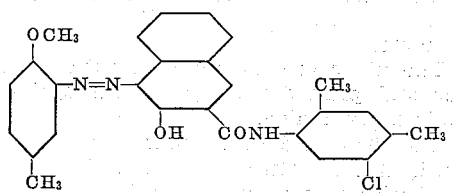

*Example 10*

A printing paste was prepared by mixing 2.1 parts of the diazo imino compound mentioned in Example 1, 1.9 parts of the 2:5-dimethyl-anilide of 2:3-hydroxy-naphthoic acid, 4 parts of the mono ethyl ether of ethylene glycol, 24 parts of water, 3 parts of sodium hydroxide solution (30%) and 65 parts of thickener as mentioned in Example 1.

Cotton or rayon piece goods were printed with the above composition and developed and described in Example 1. A bluish red dyeing was obtained of good general fastness properties. The new color had the following probable formula:

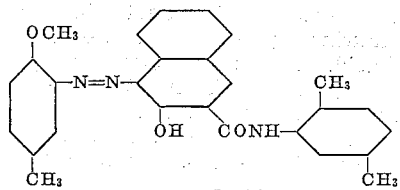

*Example 11*

A printing paste was prepared by mixing 2.4 parts of the diazo imino compound mentioned in Example 1, 1.6 parts of the aceto acet para phenetidine, 4 parts of the mono ethyl ether of ethylene glycol, 24 parts of water, 3 parts of sodium hydroxide solution (30%) and 65 parts of thickener as mentioned in Example 1.

Cotton and rayon piece goods were printed with the above composition and developed as described in Example 1. A yellow dyeing was obtained of good general fastness properties. The new color had the following probable formula:

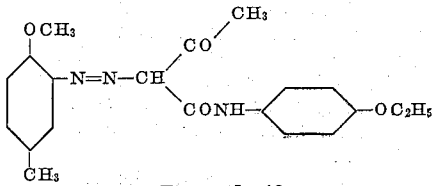

*Example 12*

A printing paste was prepared by mixing 2.1 parts of the diazo imino compound mentioned in Example 1, 1.9 parts of the coupling component obtained by diazotizing 5-nitro-2-amino-anisole and coupling in acid solution with 1-amino-7-naphthol, 4 parts of the mono ethyl ether of ethylene glycol, 24 parts of water, 3 parts of sodium hydroxide solution (30%) and 65 parts of thickener as mentioned in Example 1.

Cotton and rayon piece goods were printed with the above composition and developed as described in Example 1. A black dyeing was obtained of good general fastness properties. The new color had the following probable formula:

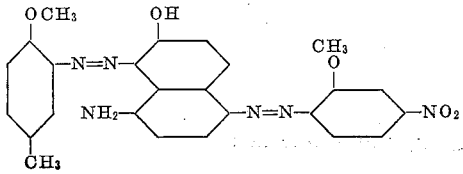

*Example 13*

A printing paste was prepared by mixing 2.1 parts of the diazo imino compound mentioned in Example 1, 1.9 parts of the coupling component obtained by diazotizing meta-nitro aniline and coupling with 1-7 amino naphthol and acetylating the product, 4 parts of the mono ethyl ether of ethylene glycol, 24 parts of water, 3 parts of sodium hydroxide solution (30%) and 65 parts of thickener as mentioned in Example 1.

Cotton and rayon piece goods were printed with the above composition and developed as described in Example 1. A brown dyeing was obtained of good general fastness properties. The new color had the following probable formula:

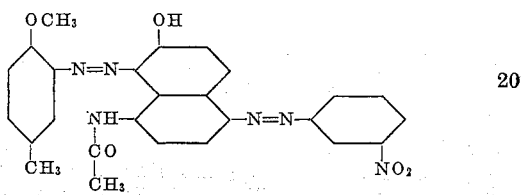

*Example 14*

A printing paste was prepared by mixing 2 parts of the diazo imino compound mentioned in Example 1, 2 parts of the coupling component obtained by diazotizing 5-nitro-2-amino anisole and coupling with 1-7 amino naphthol and acetylating the product, 4 parts of the mono ethyl ether of ethylene glycol, 24 parts of water, 3 parts of sodium hydroxide solution (30%) and 65 parts of thickener as mentioned in Example 1.

Cotton and rayon piece goods were printed with the above composition and developed as described in Example 1. A dark brown dyeing was obtained of good general fastness properties. The new color had the following probable formula:

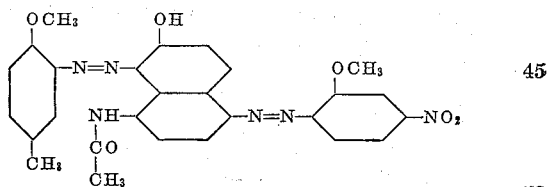

*Example 15*

A printing paste was prepared by mixing 1.8 parts of the diazo imino compound of the following formula

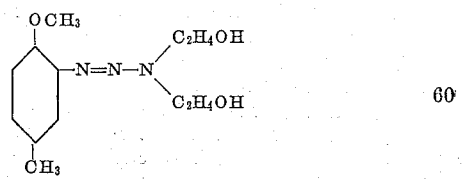

which was obtained by the action of diazotized cresidine on diethanol amine, 2.2 parts of m-nitro anilide of 2:3-hydroxy naphthoic acid, 4 parts of the mono ethyl ether of ethylene glycol, 24 parts of water, 3 parts of sodium hydroxide solution 30% and 65 parts of a thickener as mentioned in Example 1.

Cotton and rayon piece goods were printed with the above composition and developed as described in Example 1. A bordeaux dyeing was obtained of good general fastness properties.

The new color had the following probable formula:

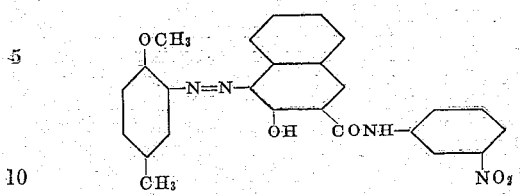

*Example 16*

A printing paste was prepared by mixing 2 parts of the diazo imino compound of the formula

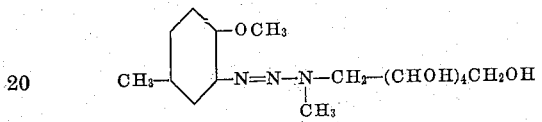

which was obtained by the action of diazotized cresidine on methyl glucamine, 2 parts of the 2:4:5-trimethyl-anilide of 2:3-hydroxy-naphthoic acid, 4 parts of the mono ethyl ether of ethylene glycol, 24 parts of water, 3 parts of sodium hydroxide solution (30%) and 65 parts of thickener.

The thickener was made by mixing 60 parts of wheat starch, 580 parts of water and 360 parts of tragacanth 6% solution.

Cotton and rayon piece goods were printed on an engraved roller with the above printing paste. The printed fabric was dried in the air and then subjected to the action of live steam containing the vapors of acetic acid. A color development took place. The printed goods were rinsed with water, boiled for 5 min. in a 0.5% soap solution, again rinsed and dried. A deep bordeaux dyeing of better fastness properties and brighter in shade than the products of the preceding examples was obtained. The new color is represented by the formula

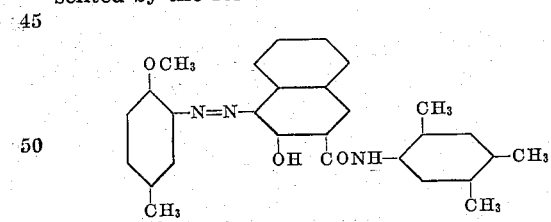

A very large number of other coupling components which are free from solubilizing groups can be used. The most suitable type of coupling components are the aryl-amides of ortho-hydroxy-aryl-amides, of carboxylic acids and of beta-keto-carboxylic acids. Among these types are the arylides of 2:3-hydroxy-naphthoic acid, of 2-hydroxy-anthracene-3-carboxylic acid, of 2-hydroxy-carbazole-3-carboxylic acid, of 7-hydroxy-alphanaphtho-carbazole-6-carboxylic acid, of 2-hydroxy-diphenylene oxide-3-carboxylic acid, of aceto acetic acid, of benzoyl acetic acid, and of terephthaloyl-bis-acetic acid.

The colors may be applied by any of the processes for the application of ice colors. These are well known in the art but they find their most important use in printing according to which alkaline compositions containing the stabilized diazo component and the coupling components is printed on the fibre and developed by hydrolysis of the diazo imino compound.

The following methods of imparting the colors to the fibres are mentioned.

1. The fibres are padded with the arylamide and then immersed in a solution of diazotized aryl amine.
2. The fibres are impregnated with the arylamide and printed with pastes containing the diazotized aryl amine.
3. The diazotized aryl amine is converted to its antidiazotate (nitrosamine) and the fibres are printed with pastes containing the antidiazotate and the arylamide. The color is then developed by treatment with a mild acid, desirably at an elevated temperature.
4. The diazotized aryl amine is reacted with one of various aliphatic, isocyclic or heterocyclic amines which desirably contains a water solubilizing group and a diazo imino derivative is formed. The fibre to be dyed is printed with a paste containing the diazo imino derivative and the arylamide. The color is then developed by hydrolyzing the diazo imino compound, such as by acting upon the printed goods with an acid, whereupon the coupling is immediately effected.

Among the desirable stabilizing agents are, methyl glucamine, diethanolamine, sarcosine, ethyl taurine, proline and 4-sulfo-2-aminobenzoic acid. The rate of color development will vary among the different derivatives of the stabilizing agents but for a given stabilizing agent, it has been found that the rapidity of development of the diazo imino compounds is rapid.

According to the present invention a large number of new ice colors of desired shade and fastness properties are produced by processes and from components which are not costly. It is evident that the shades may be varied by varying the azo dye coupling components.

The preferred dyes are those made by coupling diazotized cresidine and the anilides of 2:3-hydroxy naphthoic acid. The anilide nucleus may be unsubstituted or it may be substituted by alkyl, alkoxy, halogen or nitro such as chloro, bromo, methyl, ethyl, propyl, butyl and the corresponding alkoxy groups. From considerations of cost, brightness of color, fastness and general excellence, the anilides of 2:3-hydroxy-naphthoic acids in which the benzene ring of the anilide is substituted by two alkyl groups and a nitro or chloro group or by three methyl groups in the 2:4:5-positions with respect to the amino group are preferred.

Since from the foregoing description of the invention it will be apparent to those skilled in the art that many embodiments of the invention may be made without departing from the spirit and scope thereof, it is to be understood that no limitations are intended in the annexed claims except those which are specifically recited or are imposed by the prior art.

I claim:

1. A compound represented by the formula

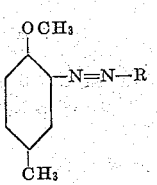

in which R is the radical of an arylide of 2:3-hydroxy-naphthoic acid.

2. A compound represented by the formula
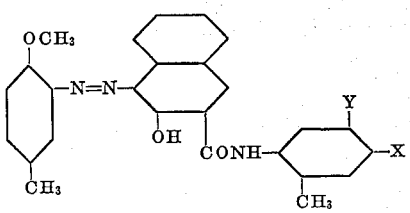
in which X is one of a group consisting of alkyl and halogen and Y is one of a group consisting of alkyl and nitro.
3. The compound represented by the formula
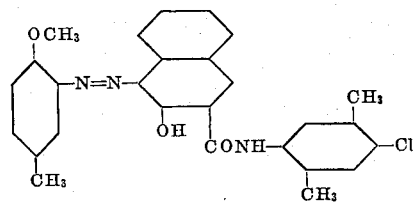
4. The compound represented by the formula
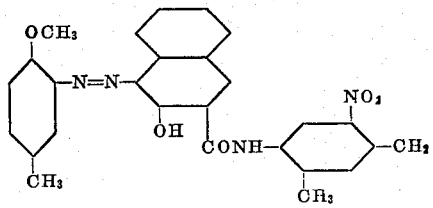
5. The compound represented by the formula
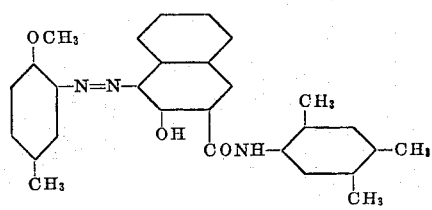
FRITHJOF ZWILGMEYER.